United States Patent [19]
Didato

[11] 3,985,462
[45] Oct. 12, 1976

[54] V-BLOCK CENTER FINDER

[76] Inventor: Thomas P. Didato, 32 Washington Ave., Middlesex, N.J. 08846

[22] Filed: June 27, 1975

[21] Appl. No.: 590,873

[52] U.S. Cl. .......................... 408/72 R; 33/185 R; 408/115 R
[51] Int. Cl.² ........................................ B23B 49/00
[58] Field of Search ............... 408/72, 116, 16, 75, 408/241 R, 115 R; 269/296, 298, 31 A, 321 N; 33/185 R, 191, 201

[56] References Cited
UNITED STATES PATENTS
1,794,162    2/1931    Flamm ........................... 33/185 R FOREIGN PATENTS OR APPLICATIONS
832,682    2/1952    Germany ........................... 33/185
12,224    5/1911    United Kingdom ............... 408/105
542,571    1/1942    United Kingdom ................. 33/185

OTHER PUBLICATIONS
"Making a Jig," *American Machinist*, Apr. 20, 1905, pp. 525–526.

Primary Examiner—Othell M. Simpson
Assistant Examiner—W. R. Briggs
Attorney, Agent, or Firm—Baldwin, Wight & Brown

[57] ABSTRACT

This disclosure relates to a device for centering a V-block relative to a tool which is to perform a machining operation on a workpiece to be mounted in the V-block. The center finder is in the form of a block contoured to seat in the V-block and having formed in the upper surface thereof grooves of a width corresponding to various machine tool widths so as to effect the centering of the center finder block relative to the tool which, in turn, automatically centers the V-block relative to the tool.

6 Claims, 5 Drawing Figures

V-BLOCK CENTER FINDER

This invention relates in general to new and useful improvements in accessories for machine tools and more particularly to a center finder to be utilized for the purpose of centering a V-block relative to a tool element.

BACKGROUND OF THE INVENTION

When round stock is to be machined, it is seated in a V-block to provide adequate support therefor. It is, however, necessary that the V-block be centered with respect to the tool element if the machining is to be centered relative to the center of the workpiece.

It will be readily apparent that it is difficult to align a V-block by eye with respect to the tool element. Accordingly, there has been desired some simple means by which alignment of the apex of the V-block with the tool element can be assured.

SUMMARY OF THIS INVENTION

In accordance with this invention, there is provided a center finder which is in the form of a block having the underside thereof of a V formation corresponding to the V-shaped opening of the V-block to be centered. The center finder is positioned in the V-block groove and the upper surface of the center finder block is aligned with the tool element.

More particularly, in accordance with this invention, the center finder is in the form of an elongated block having a V-shaped undersurface adapting to fully seat the center finder block in an associated V-block and wherein the upper surface of the center finder block is provided with one or more longitudinally extending grooves. After the V-block has been suitably mounted, a dowel is placed in the chuck of the machine tool in projecting relation and this dowel is aligned with that groove of the center finder block which corresponds to the dowel in size, after which the V-block is then centered relative to the head of the machine tool. The dowel is then removed, and the desired tool element is mounted in the head of the machine tool. A workpiece clamped in the V-block can then be accurately machined in the desired manner.

With the above and other objects in view that will hereinafter appear, the nature of the invention will be more clearly understood by reference to the following detailed description, the appended claims and the several views illustrated in the accompanying drawings:

IN THE DRAWINGS

Figure 1:
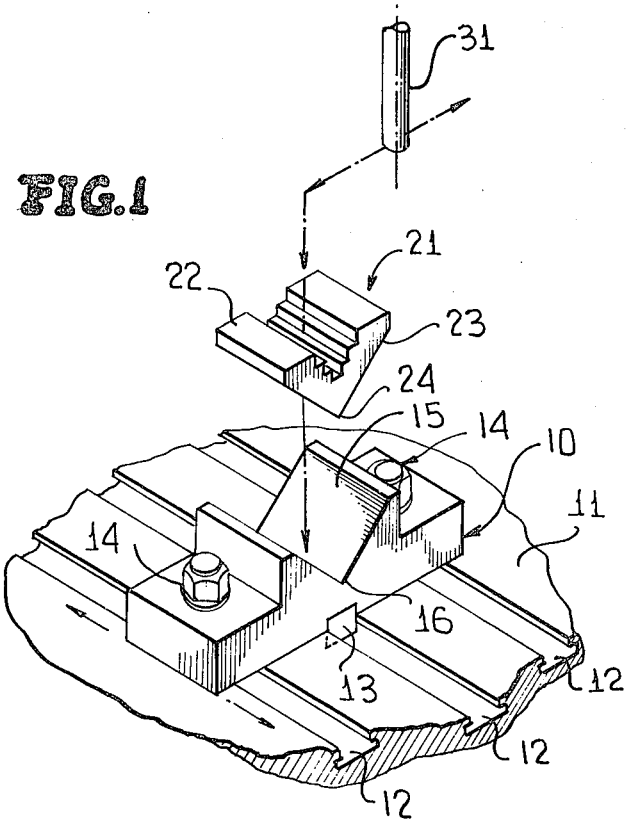
FIG. 1 is an exploded perspective view showing the center finder and generally the relationship of the center finder with respect to a V-block to be centered and an element representing a tool element to be utilized in such centering operation.

Referring now to the drawings in detail, it will be seen that there is illustrated an application of the invention as applied to a milling machine and wherein in the various Figures a conventional V-block, generally identified by the numeral 10, is illustrated as being clamped to a table 11 of a milling machine. The table 11 is illustrated as being provided with the customary inverted T grooves 12 and with the V-block 10 being longitudinally aligned with one of the grooves 12 by means of a key 13 and clamped in place by means of T-head fasteners 14 interlocked in others of the T-grooves.

It is to be understood that the V-block 10 is a conventional V-block and has a longitudinally extending V-seat 15 formed therein terminating at a lower apex 16 which extends longitudinally of the bed 11 parallel to the T-grooves 12.

If desired, the V-block 10 may be modified to have formed therein a vertically extending, internally threaded bore 17 which is vertically centered relative to the apex 16. The purpose of the threaded bore 17 will become apparent hereinafter.

Figure 4:
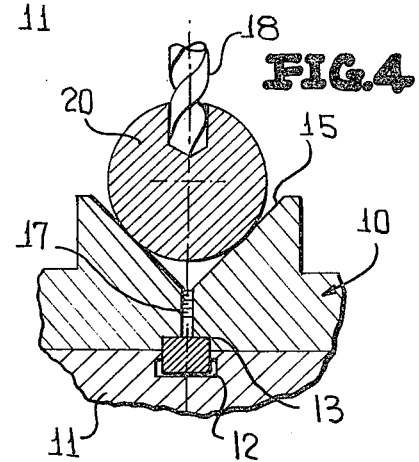
FIG. 4 is a transverse sectional view taken through the V-block and shows a workpiece mounted therein with the workpiece being machined by a tool element which is centered relative to the V-block.

It is to be understood that the milling machine of which the table 11 is a part will be provided with the customary milling head (not shown) in which a milling tool element 18 may be removably chucked. If a workpiece, such as the workpiece 20 illustrated in FIG. 4 is to be machined, for example, to have a keyway formed therein, with the machining being centered relative to the center of the workpiece, it is necessary that the apex 16 of the V-block seat 15 be vertically aligned with the axis of the milling machine head. In order to effect alignment of the tool element with the apex of the V-block 10, there is provided the center finder which is the subject of this invention, the center finder being generally identified by the numeral 21.

Figure 2:
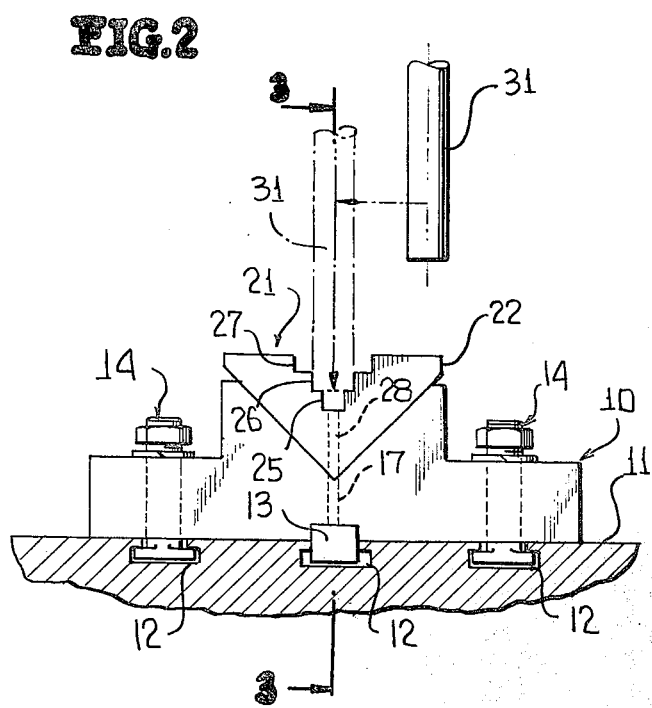
FIG. 2 is an end elevational view of the V-block with the center finder seated therein and showing the manner in which the center finder is centered relative to the head of the machine tool.

The center finder 21 is in the form of a longitudinally elongated block 22 having a V-shaped undersurface 23 which matches the V-shaped seat 15 of the V-block 10 so that the center finder block 22 will fully seat in the V-block 10 in the manner shown in FIG. 2. The undersurface 23 has a lowermost longitudinally extending apex 24 which will correspond to the apex 16 of the seat 15.

In order that the center finder 21 may function, there is formed in the upper surface thereof a plurality of longitudinally extending grooves 25, 26 and 27 all of which are centered with respect to a longitudinal vertical plane passing through the apex 24. The grooves 25, 26 and 27 will each be of a width corresponding to a conventional dimension. For example, the groove 25 may have a width of 0.250 inch, the groove 26 will have a width of 0.500 inch and groove 27 will have a width of 1.00 inch. Further, in order to prevent an interference fit, it is preferable that the grooves be minutely oversized from the dimensions given above.

It is to be understood that it is absolutely necessary that the center finder block 22 be fixed relative to the V-block 10 at the time of the centering of the V-block 10. Any type of clamp or hold down may be utilized. On the other hand, the center finder block 22 may have a center bore 28 extending vertically down through the apex thereof in alignment with the internally threaded bore 17. Then a small machine screw 30 (FIG. 3) may be utilized to secure the center finder 21 in the V-block 10.

Figure 3:
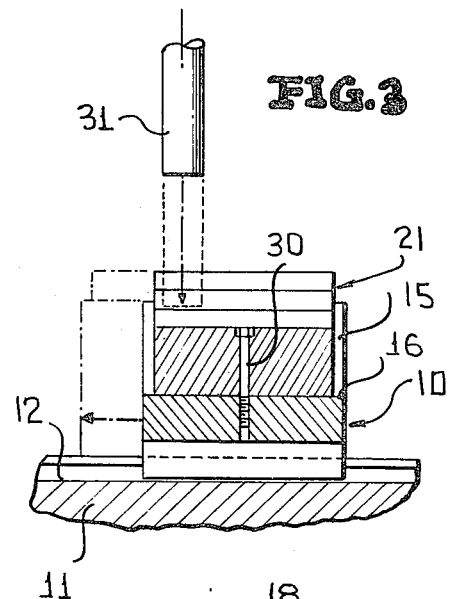
FIG. 3 is a fragmentary longitudinal sectional view taken along the line 3—3 of FIG. 2 and shows further the relationship of the various components of the V-block, center finder and machine tool.

Having mounted the center finder 21 and the V-block 10 with the V-block 10 being mounted on the table 11, a suitable size dowel 31 is checked in the head of the milling machine and then the V-block 10 is shifted longitudinally, as is generally shown in FIG. 3, until it is generally longitudinally centered relative to the dowel 31. Thereafter, the table 11 and the milling machine head are relatively shifted transversely so as to align the dowel 31 with the respective groove in the center finder 21, as is shown in FIG. 2. Having so aligned the center finder 21 with the dowel 31, the dowel 31 is removed from the milling head and the desired tool element, such as the tool element 18 is then mounted in the milling head. The tool element 18 is now with its center lying in a vertical plane passing through the center of the workpiece 20 which has been suitably clamped on the V-block 10.

Figure 5:
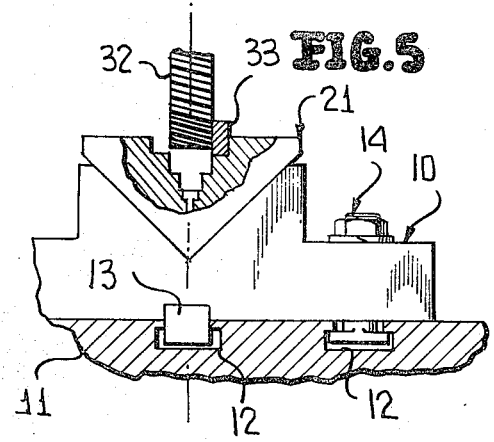
FIG. 5 is a view similar to FIG. 2 and shows the manner in which the two elements itself may be utilized in the centering of the V-block.

It is also feasible to utilize the center finder 21 directly with a tool element, such as the tool element 32 in FIG. 5. Instead of the tool element being moved into the respective size groove in the center finder 21, a suitable spacer block 33 is seated in one side of a larger size groove and the tool element 32 is brought into side contact therewith, as is shown in FIG. 5.

Although the invention has been specifically illustrated and described only with respect to a milling machine, it is to be understood that the center finder 21 may be utilized in conjunction with a V-block with respect to other machine tools, including a drill press and other bed type machines.

Although only a preferred embodiment of the invention has been specifically illustrated and described herein, it is to be understood that minor variations may be made in the constructional details and use of the center finder, without departing from the spirit and scope of the invention, as defined by the appended claims.

I claim:

1. A center finder for use with a V-block support for an article to be machined, said center finder comprising an elongated block of a transverse V outline for seating in matched relation in a V-shaped seat of a V-block article support, said center finder block having a lower apex extending in a longitudinal vertical plane, said plane bisecting the angle included by the V outline, and said center finder block having formed in an upper part thereof at least one longitudinally extending centering groove centered relative to said vertical plane for receiving a tool to effect centering of the tool relative to the V-block.

2. The center finder of claim 1 wherein there are a plurality of said centering grooves each centered relative to said vertical plane, said centering grooves each being of an increasing width remote from said apex.

3. The center finder of claim 1 together with means for releaseably fixedly securing said center finder block to an associated V-block.

4. A V-block and center finder assembly comprising a V-block having means for fixedly securing the same to a machine tool table, said V-block having a longitudinally extending and upwardly opening V-cross sectional groove therein defining a V-seat, and a center finder in the form of an elongated block havng a lower longitudinally extending and V-cross sectional surface matching that of said V-seat for flush seating engagement thereon, said center finder block having an upper surface with there being formed in said upper surface at least one longitudinally extending centering groove centered relative to a vertical plane, said plane bisecting the angle included in said V-seat, said groove receiving a tool to effect centering of the tool relative to said V-block.

5. The center finder of claim 4 wherein there are a plurality of said centering grooves each centered relative to said vertical plane, said centering grooves each being of an increasing width remote from said apex.

6. The center finder of claim 4 together with means for releaseably fixedly securing said center finder block to said V-block.

* * * * *